Figure 1:
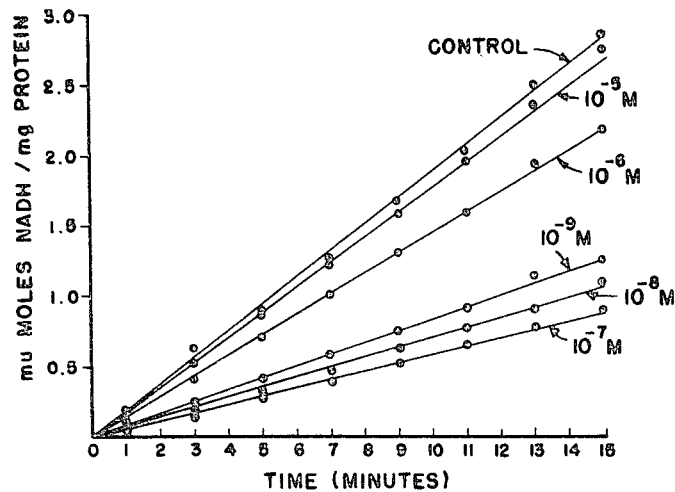

United States Patent

[11] 3,616,257

[72] Inventor Clemens J. Ackerman
 1500 Spring Garden St., Philadelphia, Pa. 19101
[21] Appl. No. 729,240
[22] Filed May 15, 1968
[45] Patented Oct. 26, 1971

[54] REAGENT FOR ASSAYING THYROMIMETRIC COMPOUNDS
 3 Claims, 3 Drawing Figs.

[52] U.S. Cl. ............................................... 195/103.5
[51] Int. Cl. ........................................... G01n 31/14
[50] Field of Search .................................. 195/103.5

[56] References Cited
 UNITED STATES PATENTS
 3,413,198 11/1968 Deutsch ........................ 195/103.5

OTHER REFERENCES

Mah et al., from the Doctoral Dissertation of Mah, V. T., Dept. of Biochem. and Nutrition, Virginia Polytechnic Institute. pp. 51 and 57 1/66

Glick, Methods of Biochem. Analysis Vol. XI 1963 p. 241

Primary Examiner—A. Louis Monacell
Assistant Examiner—Max D. Hensley
Attorneys—William H. Edgerton, Richard D. Foggio, Joan S. Keps, Alan D. Lourie and Joseph A. Marlino ABSTRACT: Thyromimetric compounds are assayed by determining the decrease in conversion of inosine-5'-monophosphate to xanthine-5'-phosphate by inosine-5'-monophosphate dehydrogenase. The rate of conversion is measured by absorption of $NADH_2$ at 340 m$\mu$.

REAGENT FOR ASSAYING THYROMIMETRIC COMPOUNDS

The present invention relates to processes and compositions for preparing reagent mixtures for detecting and measuring the presence of thyromimetic compounds in a sample. It also relates to the novel reagent mixtures for assaying for such hormones in biological samples.

In the clinical diagnosis of certain pathological conditions, it is frequently valuable to know the amount of activity or the quantity of certain substances present in a specimen of a biological or other fluid or tissue. One of the more effective means that has been proposed for making assays of such specimens is to provide a liquid reagent which contains one or more biological components. When a given reagent is mixed with the specimen, the components are effective to cause an enzymatic reaction that involves the unknown substance. By observing this reaction, it is possible to determine the quantity or amount of activity of the unknown originally present.

For example, complete and accurate diagnosis of any thyroid disorder requires the use of one or more laboratory tests, and since the clinical symptoms of thyroid disease are often obscure and confusing, the use of these procedures is a part of many diagnostic surveys and physical examinations. The physician must not only select the right test, but also consider numerous sources of error in interpreting the results.

This invention should replace other techniques for evaluating thyroid hormone level of humans or animals. The methods now in use do not measure thyroid hormones directly, but are indirect methods (Basal metabolic rate; or butanol extractable iodine), which are subject to interferences of many kinds. These techniques are expensive, tedious and often require expensive equipment. The present invention will measure thyroid hormones directly, with inexpensive equipment and supplies, and in a short period of time (10–20 minutes). It will be possible to run the assay almost anywhere that a convenient photometer is available.

Among the known purine nucleotide interconversions is that inosine-5'-phosphate (IMP) to xanthine-5'-phosphate (XMP), which requires the presence of suitable enzyme, such as inosine-5'-phosphate dehydrogenase, (IMPDH), the coenzyme diphosphopyridine nucleotide ($DPN^+$ or NAD). A source of potassium ions may also be required, depending upon the source of the IMPDH. XMP is then converted to guanosine-5'-phosphate (GMP). This reaction requires glutamine and adenosine triphosphate (ATP).

I have discovered that the biologically active forms of thyroid hormones inhibit the IMP to XMP conversion in aqueous concentrations between $10^{110}$ and $10^{15}$ molar. The implications of my discovery are manifest in that it provides a novel method of measuring these important hormones directly, using conventional spectrophotometric devices.

It is an object of this invention to provide a novel method for the assay of biologically active thyroid hormones in a sample, such as serum or blood.

It is another object to provide a stable novel assay material for assaying thyroid biological samples employing conventional spectrophotometric methods.

It is yet another object to provide a direct, economical, and relatively fast method for assaying for active thyroid hormones.

Ordinarily, such reagent mixtures contain one or more biological components such as enzymes, coenzymes and/or substrates, etc. This reagent is inherently of a very unstable nature and has very little, if any, shelf life. To insure to reagent being at optimum strength it must be prepared at, or immediately prior to, the time the assay is made. In addition, heretofore, the various components such as enzymes, coenzymes, substrates, etc., included in the assay mixture can be expected to be very unstable.

It should also be noted that after the assay mixture is fully prepared, at least one of the components therein, and particularly the enzymes are quite unstable and rapidly lose their activity. As a consequence, if the mixture is not used within a short period of time following its preparation, it must be discarded and, therefore, wasted. The percentage of the reagent wasted in this manner becomes very large where only a few assays are made at infrequent intervals.

To insure these components being at their optimum, it has been necessary for the components to be stabilized in a concentrated form.

It is an additional object of the present invention to provide means which will be effective to overcome the foregoing difficulties. More particularly, it is proposed to provide new and novel assay materials useful in making thyroid assays and the method for preparing the materials. All of the assay materials are in a dry, solid state that may be easily handled and used. The assay materials include components such as enzymes, coenzymes and/or substrates which have heretofore been very unstable. Moreover, the combining of such components tends to reduce their stability. However, stabilizers are included that are effective to maintain or preserve the activity of each of the components and of the entire assay material. Each of the components including those containing the enzymes may be stabilized individually and used as such for any desired purpose. Also, the compounds may be combined together to form a new and novel assay material. The resultant assay material contains all of the components except water, for making a liquid reagent that can be used to make a biological assay of the above described type.

Although the assay material contains various components such as enzymes, coenzymes and/or substrates, etc., the material is in a dry, solid form and will be very stable and have a long shelf life. This will permit the assay material to be packaged into containers which are easy to handle and use. Each of the containers may include a quantity of the assay material that is just the right amount for making a particular number of assays, for example a single assay. The assay material may desirably include a bulking agent which, among other things, is effective to increase the volume of the assay material to a standard size whereby the quantity of the assay material required to produce a single assay will always be a standard amount. In order to make an assay, the contents of one of a standard size container may be mixed with a predetermined quantity of water to produce a liquid reagent that is suitable for making a single assay. In addition, this agent can facilitate handling during manufacture and increase shelf life. A preferred agent is mannitol. It will thus be seen that the possibility of human errors is eliminated and a relatively inexperienced person may prepare the liquid reagent mixture and make the desired assay without any time-consuming measurements, using any large quantities of glassware, etc.

These and other objectives and advantages of the present invention will become readily apparent from the following detailed description of a number of embodiments of the present invention.

As is well known, dehydrogenases are generally very unstable. In fact, heretofore, in order to maintain enzymes of this type in a stable condition, it has been necessary to keep them in a concentrated form and at low temperatures. In addition to being concentrated, it has also been usually necessary for the enzyme solution or suspension to include a substantial amount of a salt such as ammonium sulfate to maintain optimal activity.

In the present invention, to prepare the assay material in a dry form one of the steps in the process is to convert the enzyme from a solution to a dry, solid form such as a powder in which the enzyme is very stable. To accomplish this, one or more stabilizing compounds may be added to the solution containing the enzymes. The particular stabilizers added to the enzyme solution will, in part, vary with the particular enzyme that is to be stabilized. However, for enzymes of this type, at least one stabilizer is chosen from one or more of the following groups. Under some circumstances it has been found to be advantageous to employ a combination of stabilizers which may include a stabilizer from several of the following groups or even a stabilizer from each group.

Group I. Mucilagenous gums or polysaccharides such as gum acacia, gum caarageenan, tragacanthin, alginic acid and pectin substances. Gum acacia has been found to be particularly well suited for this purpose. In addition to or as an alternative to the gums, the stabilizer may include other polymers containing hydroxy groups or other hydrophilic substituted groups which render the resultant polymer essentially soluble in water such as, polyvinylpyrrolidine, carbowax and polyvinyl alcohol. This will also insure all of the assay material dissolving rapidly in the water when the reagent is prepared. However, it is also possible to use any other polymers which because of large chains or hydrophylic substituent is only partially soluble in water but which equilibriate with the aqueous phase such as ion exchange resins, ion exchange cellulose, carboxymethyl cellulose.

Group II. A buffer consisting of a hydroxyalkylamine including but not limited to primary amines such as tris (hydroxymethyl) aminomethane or a tertiary amine such as triethanolamine.

Group III. A sequestering or complexing agent such as ethylenediamine tetraacetic acid or one of its salts which has been found to be particularly well suited.

Group IV. An inert soluble protein such as bovine serum albumin.

Group V. Salts of a polyvalent anion such as ammonium sulfate, or sodium potassium tartrate, which have been found particularly suitable.

Group VI. Sulfhydryl compounds, such as dithioerythritol, cysteine, or reduced glutathione, which have been found particularly suitable.

After one or more of the stabilizers of the class described above has been completely dissolved or uniformly dispersed throughout the entire mixture, the enzyme or enzymes in solution are very stable. It has been found that by adding these stabilizers to the solution, the activity of the enzymes is often increased. This is believed to result from the elimination of the effects of certain inhibitors which are usually present with the enzymes. In the event it is desired to decrease the activity of the solution, the solution may be diluted by adding water. Conversely, if it is desired to concentrate or increase the amount of activity of this enzyme solution, a portion of the liquid may be removed. Preferably, the liquid is removed by evaporation while the solution is maintained at a relatively low temperature. It may thus be seen that a very stable enzyme solution is provided at this point and that the stability of the solution is independent of the concentration of the enzyme or the salts therein and exhibits stability over a wider range of temperature.

It is an overall objective to provide an integrated assay material, which is dry, stable, enzymatic, pyridine nucleotide linked, and uniform in results under varying climatic and storage conditions.

The above-described stabilized enzyme solution may be used for numerous purposes as a solution. However, under some circumstances such as the preparation of the present assay material, it may be desirable to convert the solution into a dry mixture or powder containing the enzyme. This may be accomplished by lyophilizing or freeze drying the solution. More particularly, the entire solution is frozen to provide a solid mass and placed under a vacuum. The vacuum is of sufficient magnitude to cause the frozen liquid to sublimate. The frozen mass is kept under this vacuum for a period sufficient to insure all of the water, etc., being removed. This will leave a solid residue that contains the enzyme or enzymes in intimate relation with the stabilizers, such as acacia, etc. These stabilizers are effective in preserving the activity of the enzyme for an extended period of time even though the enzyme is in the form of a solid.

The term stabilizer, as used herein broadly relates to a substance which prevents the change or destruction of a reagent component. It has three major aspects in the present invention, namely: 1) to allow for convenient handling of the components during manufacture; 2) to permit the preparation and storage of a component in dry form; and 3) to provide long term shelf life of the finished product.

The residue will normally be in a fluffy or flaky condition. However, if it is desired, the residue may be ground until it is reduced to a finely powdered mixture. The grinding may be accomplished by any suitable means such as a ball mill. The fact that the powder mixture is substantially dry contributes to the physical stability of the mixture and substantially eliminates the tendency to compact or become lumpy, etc. Since the mixture can be maintained as a loose powder it will be easy to handle and process. Also, it can be easily measured either volumetrically or gravimetrically. At this point a powder is provided that includes one or more enzymes in a very stable form. Since the powder does not include any form of substrate, it can be used as an enzyme for any desired purpose. For example, among other things, the enzyme powder may be employed to complete the preparation of the present assay material.

In order to complete the preparation of the assay material the other components such as the buffers, substrates, coenzymes, and bulking-stabilizing agents, may be prepared for mixing with the stabilized enzymes. It is one of the primary purposes of the buffer materials to maintain the conditions suitable for the assay reaction to occur at an optimum rate. When the assay material is dissolved in water, the buffers will, among other things, be effective to maintain the pH of the liquid reagent. In addition, when the liquid reagent is, in turn, mixed with a specimen containing the unknown, the pH of the resultant specimen mixture will still be suitable for the assay reaction to occur.

The particular buffer material that is employed in any particular assay material will be dependent upon the particular assay reaction to be conducted and the other components in the assay material. However, normally, they will be in a class that includes the salts of polyvalent inorganic anions and organic amines together with the acids and salts thereof. By way of example, the salts of polyvalent inorganic anions may include at least sodium and potassium phosphates and sodium and potassium pyrophosphates. By way of example, organic amines and acids, and their salts may include at least tris (hydroxymethyl) aminomethane and imidazole (and their salts, such as the hydrochloride, succinate, sulfate), succinic, aspartic, and glutamic acids (and their salts such as the sodium, potassium and lithium), glycylglycine, and glycine.

The buffer materials may be prepared in the form of a dry powder that is mixed directly with the lyophilized powder containing the enzyme and the stabilizer. The resultant powder will contain the enzymes required for the assay reaction. Because of the stabilizers and buffers present in the powder, the enzymes will be very stable. This resultant powder like the enzyme powder first described, will not be hydroscopic, in contrast to corresponding mixtures prepared by lyophilization of the combined buffer and enzyme solutions.

The coenzyme enters into the reaction and is converted from one form to another form. The extent to which the coenzymes is converted is determined by the extent to which the assay reaction progresses. The coenzyme may be readily converted from one form (such as oxidized) to another form (such as reduced). In addition, the two forms of the coenzymes may be distinguished from the fact that each absorbs light at a characteristic wavelength. When it is in the other form, it is transparent at the designated wavelength, although the absorption band may be any desired wavelength that is convenient to use. However, it is desirable that it be distinct from the intense absorption bands of the rest of the components in the assay material and the substances in the specimen. This will insure all of the substances in the reagent and the specimen, except the coenzyme, being transparent or substantially transparent although some of the various components may absorb limited quantities of light in the region of the selected wavelength and they will not vary during the period of assay whereby the only variable will be the coenzyme in the absorbing form. Thus, by measuring the optical density at the designated wavelength, the amount of the coenzyme converted may be determined. More specifically, by measuring the amount of change or rate of change of the optical density at the designated wavelength, the amount or rate of the assay reaction may be measured. It has been found that the pyridine nucleotides are particularly well suited for this purpose. When they are in their reduced form, they show absorption of ultraviolet light with a maximum value at a wavelength of about 340 millimicrons. By employing a coenzyme of this class in all forms of the assay material, the assay reactions may be observed by always measuring the optical density at this wavelength.

Coenzymes of this class have a limited amount of stability in a solid form. They can be stored in a solid form for only short periods of time. The stability of the coenzyme may be increased by preparing a lyophilized powder of the coenzyme and acacia. Further increases in the stability of the coenzyme may be obtained by mixing with mannitol. Accordingly, the coenzyme may be ground into a powder and mixed directly with the lyophilized powder containing the enzyme, stabilizer and buffer.

In addition to the foregoing components, it has also been found desirable to add a bulking-stabilizing agent to the mixture. This agent may be a polyhydric substance such as mannitol, sorbitol, lactose, polyvinyl alcohol or polymers having from b 1 to 5 hydroxyl groups per monomeric unit. The bulking agent is not active in the assay reaction. Accordingly, the quantity of the bulking agent added to the assay material is not critical and may be varied throughout a wide range. However, the bulking agent performs several unexpected and useful functions. First of all, the bulking agent tends to further increase the stability of the assay material for several reasons. Such agents have the ability to absorb and retain limited quantities of moisture whereby the assay material is not materially affected when exposed to reasonable amounts of moisture. This increases the stability of the assay material and prevents its losing its activity. It has also been found that the bulking agent will also be effective in preserving the assay material by increasing the compatibility of its components. It has also been found that bulking agents of this category are also effective in increasing the ability of the assay material to withstand relatively high temperatures, such as 50° C., for longer periods of time. Heretofore, temperatures in this range have caused rapid deterioration of the enzymes, coenzymes, and other components.

Secondly, it has been found that the use of the bulking agent in the assay material results in the assay material dissolving more rapidly into water. This not only reduces the time required for preparing the liquid reagent but also increases the convenience of preparation by reducing the amount of stirring or shaking.

Thirdly, since the bulking agent does not enter into the reaction or affect the components in the assay material, the quantity of the bulking agent added to the assay material may vary over a wide range. Once a batch of the assay material has been prepared, its strength or amount of activity may be determined. The bulking agent may then be added to standardize the assay material to a predetermined level. This will result in the assay material always having a predetermined amount of activity per unit irrespective of the batch in which it is prepared. Of the agents listed above, mannitol is preferred.

After the assay material has had the bulking agent added, it may be divided into units of a standard predetermined size. The size normally will be just large enough to make a single assay or an integral number of assays. Each of these units may then be packaged into a container such as a capsule, glass vial, etc.

It will thus be seen that a plurality of substantially identical packages such as foil containers or capsules may be provided. Each of these capsules will contain just a sufficient quantity of the assay material for making a single assay of a specimen. The assay material contained in the package is all premeasured and of a predetermined activity. Accordingly, it may be dissolved directly in a standard amount of water so as to form a liquid reagent. This liquid reagent is then mixed with the specimen to produce an enzymatic reaction. The extent of or the rate at which the reaction occurs will be a function of the quantity or amount of activity of the original unknown. Every test, will involve the conversion of a coenzyme from one form to another form wherein one form has an optical absorption at a predetermined wavelength. Accordingly, the optical density of the specimen at that wavelength will vary as a density of the medium at different times, it will be possible to compute the quantity or amount of activity of the thyroid hormones in the original specimen.

The invention sought to be patented in a principal process of making aspect, is described as residing in the concept of preparing an assay reagent, useful, inter alia, as an aid in the clinical diagnosis of pathological conditions to determine the presence of, quantity of, or amount of activity of thyroid hormones in a sample, by mixing therewith a lyophilized, stabilized, catalytic reagent while in substantially anhydrous particulate form, comprising a dry coenzyme, a dry purine nucleotide, a dry enzyme capable of catalyzing the conversion of both of said nucleotide to another purine nucleotide, and of the coenzyme, effective to determine the quantity of the hormones present. The rate of this coenzyme conversion is dependent upon the quantity of hormones present.

This invention will be better understood when considered in connection with the following and the drawings in which:

FIG. 1 is a series of curves illustrating the inhibition of IMP-dehydrogenase activity by L-throxine (LT-4), at different molar concentrations. Incubation media (in $\mu$ moles): IMP, 19.8; NAD, 14.7; Tris-phosphate, pH 8.3, 20 L-T$_4$ as indicated and 0.4 mg. of enzyme protein in a total volume of 1.5 ml. The temperature was 28° C. The enzyme purified by precipitation with $(NH_4)_2SO_4$ and passage through a DEAE-Sephadex A-50 column, was obtained from the acetone powder of the supernatant fraction of livers of normal rats.

Figure 2:
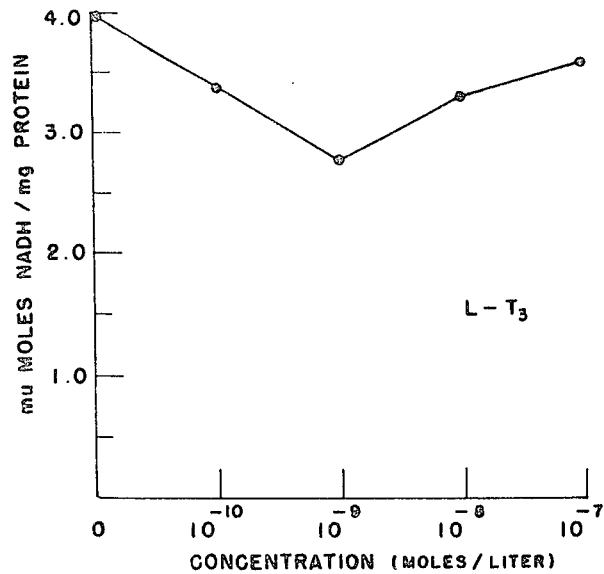

FIG. 2 is a plot of the inhibition of IMP-dehydrogenase activity by triiodo-L-thyronine (LT-3). The incubation media was as described under FIG. 1 except that 0.25 mg. of enzyme protein was used and triiodo-L-thyronine was added as indicated. The enzyme, purified by precipitation with $(NH_4)_2SO_4$ and passage through DEAE-Sephadex, was obtained from the acetone powder of the supernatant fraction from livers of normal rats.

Figure 3:
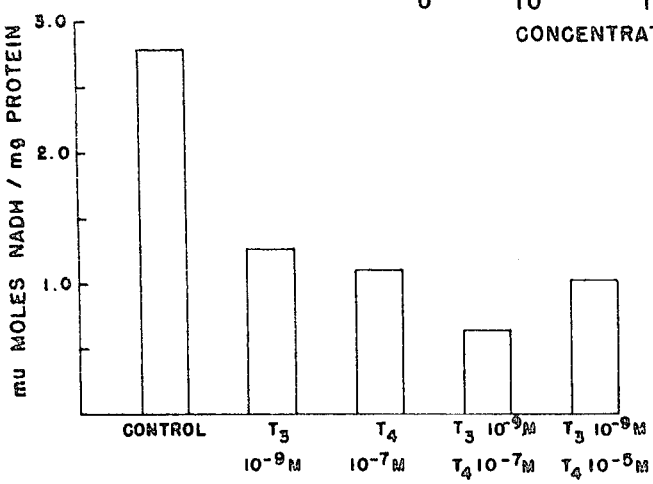

FIG. 3 is a bar graph of the relative inhibition of IMP-dehydrogenase activity by L-thyroxine, (LT-4), triiodo-L-thyronine (LT-3) and combination of these hormones. The enzyme, the incubation media, and procedure were as described under FIG. 2 except that 0.3 mg. of enzyme protein was used, and hormones were added as indicated. Incubated at 28° C. for 15 minutes.

RESULTS

When the enzyme was prepared from the livers of normal rats and passed through DEAE-Sephadex, both L-T$_4$ and L-T$_3$ inhibited the reaction (FIGS. 1 thru 3). The response was biphasic. $k$ Inhibition was maximal with $10^{17}$ M of L-T$_4$ as seen in FIG. 2. As the concentration was increased, the inhibitory effect decreased.

The same phenomena was observed with L-T$_3$. The results of a typical experiment, plotted as a function of concentration, are shown in FIG. 2. The inhibition was maximal with $10^{19}$ M of L-T$_3$ and again, the inhibitory effect decreased when the concentration was increased. Neither L-T$_4$ nor L-T$_3$ were ever observed to effect a stimulation of the liver enzyme (up to $10^{15}$ M of L-T$_4$ or of L-T$_3$).

Since both hormones are present simultaneously in the blood of normal animals, it was of interest to determine the effect of both hormones on IMP-dehydrogenase. However, the phenomena observed above suggested that if both hormones are present simultaneously, and they acted on the same site on the enzyme, the degree of inhibition should be that expected from the total hormone concentration, i.e., $10^{19}$ M of L–$T_3$ pulse $10^{17}$ of L–$T_4$ would effect an inhibition less than either one alone. This did not occur as seen in FIG. 3. The combination of L–$T_3$ and L–$T_4$ at their optimum concentrations effected a greater inhibition than either one alone. Then, when the concentration of L–$T_4$ was increased to $10^{15}$ M, the inhibitory effect approximated that of L–$T_3$ alone. This would be expected from the results shown in FIG. 2 where the effect of $10^{15}$ M of L–$T_4$ was negligible. I concluded that L–$T_4$ and L–$T_3$ do not compete for the same site on the enzyme. This observation makes possible the assay of both L–$T_3$ and L–$T_4$ present in the same specimen.

Six different derivatives were tested at 3 different concentrations for their ability to inhibit IMP-dehydrogenase. The results are summarized in table 1. The first three are considered to be physiologically inactive, and these compounds did not inhibit the reaction. At $10^{17}$ M, diiodotyrosine stimulated the reaction 34 percent above the control level. Diiodothyronine stimulated the reaction at all there levels tested. At $10^{17}$ M, this response was 35 percent above the control level.

Those compounds which are considered to be physiologically active, inhibited the reaction (table 1 ) but no maximum was observed within the concentration range tested. The inhibition by triiodothyropropionate, tetraiodothyropropionate and tetraiodothyroacetate increased as their concentrations were increased.

cold ($-11°$ C.) ethyl ether. This was then dried in vacuo over $P_2O_5$. The pink, dry powder could be stored at $-15°$ C. for about 2 weeks without appreciable loss in enzymic activity.

One to 2 g. of the acetone powder were suspended in 15 volumes (v/w) of 0.02 M Tris-phosphate buffer, pH 8.3, for 30 minutes at 5° C. and then centrifuged. Solid $(NH_4)_2SO_4$ was dissolved in the supernatant fraction to 30 percent of saturation. After centrifugation, the supernatant fraction was brought to 40 percent of saturation with $(NH_4)_2SO_4$. The precipitate was collected by centrifugation, and dissolved in 5.0 ml. of the tris-phosphate buffer which contained 60 mg. of cysteineHC1. This was added to a DEAE-Sephadex* A–50 column ($15 \times 1.5$ cm.$^2$) that had been equilibrated with the same buffer. The enzyme was eluted from the column with an increasing concentration gradient of buffer (300 ml. of 0.5M tris-phosphate, pH 8.3, in the reservoir added to 100 ml. of 0.02M tris-phosphate buffer, pH 3.3 in the mixing chamber). The second 5 ml. eluted from the column contained approximately 60 percent of the recoverable enzyme activity. This fraction was used for experiments involving the purified enzyme. Solutions of this enzyme preparation at 5° C. lost 50 percent of their activity in 24 hr. The enzymic activity per mg. of protein was approximately 30 times that of the acetone powder. The pH optimum was 8.3 when determined with 0.02M Tris-phosphate buffer in increments of 0.03 pH units between pH 7.5 to 9.0. *Weakly basic anion exchanger synthetic compound derived from the polysaccharide, Table 1. The effect of thyroid hormones and certain analogues of L-thyroxine on IMP-dehydrogenase of rate liver

| Compound | Mg. protein | Concentration | | | |
| --- | --- | --- | --- | --- | --- |
| | | 0.0 mu moles | $10^{-9}$ DPNH/ mg. | $10^{-7}$M protein/ 15 min. | $10^{-5}$M protein/ 15 min. |
| 3, 5-diiodo-L-tyrosine | 0.25 | 3.5 | 3.7 | 4.7 | 3.3 |
| 3, 5-diiodo-L-thyronine | 0.25 | 3.7 | 4.1 | 5.0 | 4.2 |
| 3, 5-diiodothyropropionate | 0.60 | 11.2 | 10.5 | 10.7 | 11.7 |
| 3, 5, 3', 5'-tetraiodothyroacetate | 0.28 | 3.6 | 3.8 | 3.1 | 2.6 |
| 3, 5, 3'-triiodothyropropionate | 0.60 | 11.1 | 10.7 | 3.2 | 1.6 |
| L–$T_4$ | 0.22 | 3.1 | 1.4 | 1.1 | 3.1 |
| L–$T_3$ | 0.30 | 4.0 | 2.7 | 3.6 | 3.9 |

NOTE: The incubation media was as described under FIGURE 1 except that the protein concentration for each experiment was as indicated. The enzyme was the purified preparation obtained from livers of normal rats.

The response of IMP-dehydrogenase to thyroid hormones is well correlated with the in vivo effects of the hormones. Both L–$T_3$ and L–$T_4$ inhibit the reaction at concentrations that may be considered physiological, and, L–$T_3$ is more effective as an inhibitor than is L–$T_4$. Analogues which are physiologically inactive do not inhibit IMP-dehydrogenase.

EXAMPLE A

PREPARATION OF IMP-DEHYDROGENASE

Crude preparations of IMP-dehydrogenase were made for the livers of thyroid hormone depleted rats. The livers from 2–5 of such rats were pooled and homogenized with 2.5 volumes (v/w) of cold (5 C) $10^{13}$ M EDTA for 30 seconds with a Servall Omnimixer run at one-half maximal speed. The homogenate was centrifuged at 100,000 g. for 1 hour. The supernatant fraction was dialyzed against 2 liters of water for 20 hr. with 3 changes of water. The dialyzed preparation was used as the enzyme.

Purified preparations of the enzyme were made from an acetone powder of the supernatant fraction of livers of normal rats, or from the livers of thyroid hormone depleted rats. To prepare the acetone powder, the supernatant fraction was poured slowly into 8 volumes of cold ($-11°$ C.) acetone with stirring. After 30 min., a precipitate was collected by rapid filtration in a Buchner funnel. The precipitate was washed twice with 30 ml. of cold ($-11°$ C.) acetone and twice with 30 ml. of dextran, having functional ionic groups attached to the glucose units by ether linkages. DEAE-Sephadex is the diethylaminoethyl derivative of Sephadex. A–50 is the higher porosity type of cross-linked gel. Supplier is Pharmacia, Uppsala, Sweden.

Enzyme Assays

The crude preparation was used to measure the synthesis of GMP by the optical method of Abrams and Bentley, Arch. Biochem. 79:91, 1959, which depends on the strong absorption by GMP at 290 m$\mu$. The absorption of IMP at this wavelength is slight. The activity of the purified enzyme preparations was followed by measuring the reduction of NAD at 340 m$\mu$. The quantity of $NADH_2$ synthesized was calculated from its molar absorbancy of $6.2 \times 10^3$, Kornberg, A. and B. L. Horecker, In Snell, E. E. (ed.) Biochemical Preparations, Vol. 3, J. Wiley and Sons, New York, p. 23. All measurements were made in cuvettes with light paths of 1.0 cm. in a Beckman model DU Spectrophotometer. Correction for endogenous enzymic activity was made by measuring absorbancies against a reference cuvette, which contained all ingredients except IMP. Protein was determined spectrophotometrically by the method of Warburg and Christian, Biochem. Z310:384, 1942.

EXAMPLE B

A solid reagent assay material that is particularly adapted to be employed for measuring the amount of thyromimetic com- International Units for the entire batch, or about $10^{+2}$ units per finished tablet. The assay may be conducted by the optical method of Abrams and Bentley, Arch. Biochem. 79:91, 1959.

Following this, the dry, lyophilized powder containing the IMPDH is prepared by mixing the following chemicals in the indicated ranges:

| | |
|---|---|
| IMPDH (the exact amount is determined by the assay) | 90–100 mg. |
| acacia (gum arabic, white powder, U.S.P.) | 2–6 g. |
| albumin (free of thyromimetic compounds) | 50–500 mg. |
| tris-EDTA solution | 10–30 ml. |
| ammonium sulfate | 15–40 g. |

These chemicals may be may mixed as follows. First, dissolve the acacia in a convenient quantity of distilled water, for ing in the careful choice of buffer, stabilizer, bulking agent, and antioxidant.

The necessary albumin may conveniently be prepared from a nondialyzable protein fraction, which, in turn may be obtained from the extraction of wheat gluten with 0.8 percent saline solution.

It may be desirable to enhance long term stability of unitized assay material by including an antioxidant sulfhydryl compound, such as cysteine, dithiorthrietol, dithioerythritol, or mixtures thereof.

In order to prepare a large number of units of this assay material or reagent, the following procedure may be employed to produce a batch of a dry assay material or reagent that may then be divided into small quantities and packaged in containers such as capsules. Wherever quantities are specified, they are suitable for preparing a batch that will yield about 10,000 capsules. However, it should be understood that these values may be varied if it is desired to produce larger or smaller batches.

The first step in the procedure is to prepare a TrisEDTA stabilizer solution. This may be accomplished by mixing the chemicals together in approximately the indicated quantities;

| | |
|---|---|
| tris-(hydroxymethyl)-aminomethane | 500–1,000 g. |
| ammonium sulfate | 250–500 g. |
| ethylenediamine tetraacetic acid tetrasodium salt | 150–300 g. |

In order to mix these chemicals together, the tris (hydroxymethyl) aminomethane is dissolved in a volume of water that is somewhat less than 1 liter to form a first solution. If it is necessary to assist in this dissolving, the solution may be heated in a water bath. After the tris is completely dissolved, the solution is allowed to cool to about 25° C. and adjusted to about pH 7.5. This adjustment may be accomplished by adding sulfuric acid in the necessary quantities to convert part of the tris (hydroxymethyl) aminomethane to its sulfate salt. After the solution is brought to pH 7.5 sufficient water is added to bring the total volume to 1 liter.

Following this, a second solution is prepared by dissolving the ammonium sulfate in 850 to 900 ml. of water. This solution is adjusted to pH 7.5 by the addition of ammonium hydroxide. The first and second solutions may then be mixed with each other to form a resultant solution. The ethylenediamine tetraacetic acid, tetrasodium salt, may then be added to the resultant solution and dissolved therein to form a buffer solution which is sometimes hereinafter referred to as the tris-EDTA buffer.

A dry, lyophilized powder containing the Inosine-5'-monophosphate dehydrogenase(IMPDH) enzyme is then prepared. However, before this powder can be prepared, it is necessary to determine first the amount of activity in the dehydrogenase to be added.

In order to insure that the tablets produced from successive batches will be of identical activity, the activity of the IMPDH should be standardized at a predetermined level. By way of example, in a batch of 10,000 tablets, there may be about 100 pound present in a serum will consist of the dry mixture of the following substances:

| | |
|---|---|
| Enzyme | Inosine-5'-monophosphate dehydrogenase (IMPDH) |
| Buffer | Phosphate ($NaH_2PO_4$ or $Na_2HPO_4$) |
| Stabilizer | Tris-(hydroxymethyl)-aminomethane and its sulfate salt, ammonium sulfate, ethylenediamine tetraacetic acid, gum acacia, and serum albumin |
| Substrate | Inosine-5'-monophosphate |
| Coenzyme | Nicotinamide adenine dinucleotide (NAD) |
| Bulking Agent | Mannitol |
| Optional Antioxidant | Cysteine |

The above components are prepared by the general methods previously described, with the especial novelty residexample 80 to 160 milliliters. The albumin is then dissolved in a second quantity of water (for example, 10 milliliters). When fully dissolved, the two solutions are mixed. The tris–EDTA prepared in the beginning is then added to the solution. The solution is now placed under a vacuum for a period of time that will assure all of the trapped air in the solution being removed. The amount of the enzyme IMPDH determined by the assay is then added to the solution. The resultant solution is then completely mixed to insure a uniform dispersion of the enzyme throughout the entire solution. The solution is then frozen and a vacuum applied to remove all of the water. The resultant lyophilized mixture will now be in a dry solid state in a quantity in the general range of about 15 to 20 grams. This dry mixture may then be mixed with the dry crystals of ammonium sulfate. The dry mixture of solids may then be pulverized into a fine powder by any suitable means such as placing it in a ball mill for several hours.

After the powder is completely mixed and pulverized to a sufficient degree, an assay may be made of the mixture to determine the units of activity of the enzyme IMPDH in each milligram of the lyophilized powder. The next step is to distribute the lyophilized powder into the tablets. However, if it is desired to delay this step, the lyophilized powder may be stored for extended periods of time in a cold place such as a refrigerator or freezer. If this is done, it is desirable to include a drying agent near the powder to prevent the absorption of any moisture.

In order to make the tablets the following are mixed together. Normally, the quantities will be in about the indicated ranges:

| | |
|---|---|
| Tris-buffer—(to give pH of 7.0 to 8.5) | 48 g. |
| Sodium phosphate, monobasic | 15 to 25 g. |
| Inosine-5'-monophosphate | 140 g. |
| NAD | 190 to 200 g. |
| IMP dehydrogenase, lyophilized | 100 International Units |

The first three compounds in the above list are first ground together to form a dry mixture. The mixture is then placed under a vacuum at a temperature of about 50° C. for a sufficient number of hours to insure all of the moisture being removed. In addition, a drying material such as phosphorous pentoxide may be included in the oven to insure a complete drying. Accordingly, the exact amounts of these compounds to be used are determined by the optimum amounts needed to produce a satisfactory reaction. Normally, these will be within the range indicated in the above table.

The resultant mixture is then pulverized into a fine powder, for example, by placing in a ball mill for several hours. When completely mixed into a homogeneous mixture, a small sample may be dissolved in water and the pH determined. If it is necessary, the pH should be adjusted so as to fall within the range of 7.0 to 8.5. If the pH is too low, additional sodium phosphate is added. If the pH is too high, a new mixture similar to the above is prepared in the same manner. However, this mixture is made definitely deficient in sodium carbonate. The second mixture is then blended with the first mixture to bring the pH into the range of 7.0 to 8.5. When the mixture is finished, it is dried again as described above. From this point forward it is important that the powder not be exposed to moisture. Generally, it is best that if the powder is to be exposed to the atmosphere, the relative humidity should be below 15 percent.

The pulverized NAD and a lyophilized powder containing the IMP dehydrogenase may then be added to the powder mixture just prepared above. Before the NAD is added, it is dried under vacuum in the presence of phosphorous pentoxide to remove moisture. At the same time that the lyophilized powder is prepared, the amount of activity of the IMP dehydrogenase is assayed, and a quantity of it is computed that would produce a total of 100 International Units for the entire batch (if 10,000 tablets are to be prepared), or $10^{12}$ units per tablet or single assay portion. Accordingly, the quantity of the IMPDH to be blended into the mixture will be determined from that assay. The quantity of NAD to be employed is the optimum quantity for an enzyme assay.

At this point, a powder is provided that contains the substrate, enzyme IMP dehydrogenase the coenzyme NAD and all of the buffers, and stabilizers, to insure the powder being a stable state that will have a very long shelf life. A sample of this powder is withdrawn (being careful not to introduce moisture) and tested. The tests are for homogeneity with respect to the NAD and the effectiveness of the powder to form an assay for thyromimetic compounds. Accordingly, this powder may be divided into a plurality of small parts that are just large enough to contain the desired $10^{12}$ International Units of IMPDH and appropriate quantities of buffer, NAD and IMP to perform a thyromimetic determination in 3 ml. Each part may then be enclosed in a suitable package such as a tablet that will protect the mixture from any moisture.

Normally, between successive batches, there will be some variations in the size of the parts into which the mixture is divided as a result of variations in the activity of the IMPDH. In order to make all of the parts of identical size in all batches, a standard package size in excess of the largest size that will be required is chosen. A suitable quantity of a bulking and stabilizing agent such as mannitol may then be added to the mixture to bring its volume up to an amount that will insure each of the parts having a volume that will just fill the package.

In order to make an assay of a serum for thyromimetic compounds using a tablet of this example, a specimen of the serum is first obtained in a quantity such as 0.1 milliliter. Following this, the contents of a tablet of this type are dissolved. The resultant solution will form a liquid reagent that is of just the right size to make a single assay, and may be mixed directly with the specimen. As soon as the reagent is dissolved, the following reaction will occur:

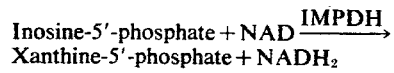

Inosine-5'-phosphate + NAD $\xrightarrow{\text{IMPDH}}$ Xanthine-5'-phosphate + NADH$_2$ Since the IMP, IMPDH and NAD are supplied in the tablet in sufficient quantity for the reaction to go at an optimum rate, the only factor that will affect the conversion rate is the concentration of thyromimetic compounds in the specimen. The rate of formation of XMP, and concurrently NADH$_2$, will be proportional to the unknown concentration. Thus, in the presence of thyromimetic compounds, the IMP will react with the NAD at a reduced rate, as compared to the optimized conversion rate in the absence of such inhibitory compounds.

By placing the assay mixture in a suitable spectrophotometer and measuring the rate of increasing optical density at 340 m$\mu$, conversion rate is readily measured, which in turn can be extrapolated to give the concentration of thyromimetic compounds present in the specimen.

The determination of the two rates can be carried out in either of two procedures with equally acceptable results. In the one, an aliquot of the assay material is dissolved in a varied quantity of H$_2$O, typically 3.0 ml. in a cuvette with 1 cm. light path, thereby initiating conversion of the IMP substrate to XMP. The rate of this conversion is reflected based on the changing optical density as described above. Next, a second aliquot of the assay material is dissolved in a separate aliquot H$_2$O, initiating the same reaction. Upon mixing the second aliquot with the specimen to form a specimen-reagent assay mixture, the decreased enzymatic conversion rate in the presence of said specimen is determined. One then takes the difference between the two conversion rates as measure of the thyromimetic compound concentration present in the specimen.

In a second procedure the steps are the same, except that the use of a second cuvette is dispensed with. Rather, a precise volume of the specimen is admixed with the already reacting specimen-reagent assay mixture, while it is disposed in the light path. The changed rate of increasing optical density is observed and recorded. Again the difference between the two conversion rates is taken as the measure of the thyromimetic compounds concentration present in the specimen.

What is claimed is:

1. The method of assaying a specimen for thyromimetic compounds employing an assay material comprising:
    a. the substrate Inosine-5'-monophosphate (IMP);
    b. the coenzyme nicotinamide adenine dinucleotide and and;
    c. liver inosine-5'-monophosphate dehydrogenase, which includes the steps of:
        i. dissolving in water an aliquot of said assay material, thereby initiating the conversion of IMP to Xanthine5'-phosphate (XMP), and determining the rate of enzymatic conversion;
        ii. dissolving in water another aliquot of said assay material, thereby initiating the conversion of IMP to XMP;
        iii. mixing the later aliquot with said specimen to form a specimen-reagent assay mixture, and determining the decreased enzymatic conversion rate in the presence of said specimen;
        iiii. taking the difference between the two enzymatic conversion rates as a measure of the thyromimetic compound concentration present in said specimen.

2. The method according to claim 1 wherein the determination of the conversion rates is made by periodically measuring the optical density of the reacting liquid reagents spectrophotometrically.

3. The method of assaying a specimen for thyromimetic compounds employing an assay material comprising:
    a. the substrate Inosine-5'-monophosphate (IMP);
    b. the coenzyme nicotinamide adenine dinucleotide (NAD), and;
    c. liver inosine-5'-monophosphate dehydrogenase, which includes the steps of:
        i. dissolving in water an aliquot of said material, thereby initiating the conversion of IMP to Xanthine-5'-phosphate (XMP), and determining the rate of enzymatic conversion;
        ii. admixing said specimen with said aliquot to form a specimen-reagent assay mixture, and determining the decreased enzymatic conversion rate in the presence of said specimen, and;
        iii. taking the difference between the two enzymatic conversion rates as a measure of the thyromimetic compound concentration present in said specimen.

* * * * *